US008061201B2

(12) United States Patent
Ayazi et al.

(10) Patent No.: US 8,061,201 B2
(45) Date of Patent: Nov. 22, 2011

(54) READOUT METHOD AND ELECTRONIC BANDWIDTH CONTROL FOR A SILICON IN-PLANE TUNING FORK GYROSCOPE

(75) Inventors: Farrokh Ayazi, Atlanta, GA (US); Ajit Sharma, Richardson, TX (US); Mohammad Faisal Zaman, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 657 days.

(21) Appl. No.: 12/218,087

(22) Filed: Jul. 11, 2008

(65) Prior Publication Data

US 2009/0064781 A1    Mar. 12, 2009

Related U.S. Application Data

(60) Provisional application No. 60/949,600, filed on Jul. 13, 2007.

(51) Int. Cl.
*G01P 9/04* (2006.01)
(52) U.S. Cl. .................... 73/504.12; 73/504.14
(58) Field of Classification Search ............. 73/504.12, 73/504.04, 504.14, 504.16, 504.15
See application file for complete search history.

(56) References Cited

U.S. PATENT DOCUMENTS

| | | | |
|---|---|---|---|
| 3,719,074 A | 3/1973 | Lynch | |
| 4,674,331 A | 6/1987 | Watson | |
| 4,793,195 A | 12/1988 | Koning | |
| 5,196,905 A | 3/1993 | Hahn et al. | |
| 5,226,321 A | 7/1993 | Varnham et al. | |
| 5,349,855 A | 9/1994 | Bernstein et al. | |
| 5,450,751 A | 9/1995 | Putty et al. | |
| 5,488,863 A | 2/1996 | Mochida et al. | |
| 5,728,936 A | 3/1998 | Lutz | |
| 5,780,739 A | 7/1998 | Kang et al. | |
| 5,780,740 A * | 7/1998 | Lee et al. | 73/504.12 |
| 5,783,749 A | 7/1998 | Lee et al. | |
| 5,911,156 A * | 6/1999 | Ward et al. | 73/504.16 |
| 5,920,012 A | 7/1999 | Pinson | |
| 5,945,599 A | 8/1999 | Fujiyoshi et al. | |
| 5,955,668 A * | 9/1999 | Hsu et al. | 73/504.12 |
| 5,992,233 A | 11/1999 | Clark | |
| 6,067,858 A * | 5/2000 | Clark et al. | 73/504.16 |
| 6,128,954 A | 10/2000 | Jiang | |
| 6,230,563 B1 | 5/2001 | Clark et al. | |
| 6,257,059 B1 * | 7/2001 | Weinberg et al. | 73/504.16 |
| 6,481,285 B1 | 11/2002 | Shkel et al. | |

(Continued)

OTHER PUBLICATIONS

Abdolvand, R. et al., "Thermoelastic Damping in Trench-Refilled Polysilicon Resonators," *Proc. Transducers 2003*, pp. 324-327.

(Continued)

*Primary Examiner* — Helen C. Kwok
(74) *Attorney, Agent, or Firm* — Burns & Levinson LLP; Bruce D. Jobse, Esq.

(57) ABSTRACT

Disclosed are methods and a sensor architecture that utilizes the residual quadrature error in a gyroscope to achieve and maintain perfect mode-matching, i.e., ~0 Hz split between the drive and sense mode frequencies, and to electronically control sensor bandwidth. In a reduced-to-practice embodiment, a 6 mW, 3V CMOS ASIC and control algorithm are interfaced to a mode-matched MEMS tuning fork gyroscope to implement an angular rate sensor with bias drift as low as 0.15°/hr and angle random walk of 0.003°/√hr, which is the lowest recorded to date for a silicon MEMS gyroscope. The system bandwidth can be configured between 0.1 Hz and 1 kHz.

14 Claims, 11 Drawing Sheets

U.S. PATENT DOCUMENTS

| | | | |
|---|---|---|---|
| 6,516,666 B1* | 2/2003 | Li | 73/504.12 |
| 6,539,801 B1 | 4/2003 | Gutierrez et al. | |
| 6,628,177 B2 | 9/2003 | Clark et al. | |
| 6,742,389 B2* | 6/2004 | Nguyen et al. | 73/504.12 |
| 6,807,858 B2* | 10/2004 | Orsier | 73/504.12 |
| 6,837,107 B2 | 1/2005 | Geen | |
| 6,843,127 B1* | 1/2005 | Chiou | 73/504.12 |
| 6,845,668 B2* | 1/2005 | Kim et al. | 73/504.14 |
| 6,848,304 B2 | 2/2005 | Geen | |
| 6,856,217 B1 | 2/2005 | Clark et al. | |
| 6,889,550 B2 | 5/2005 | Beitia | |
| 6,909,221 B2 | 6/2005 | Ayazi et al. | |
| 6,985,051 B2 | 1/2006 | Nguyen et al. | |
| 7,023,065 B2 | 4/2006 | Ayazi et al. | |
| 7,043,985 B2* | 5/2006 | Ayazi et al. | 73/504.04 |
| 7,176,770 B2 | 2/2007 | Ayazi et al. | |
| 7,337,671 B2 | 3/2008 | Ayazi et al. | |
| 7,360,423 B2 | 4/2008 | Ayazi et al. | |
| 7,389,690 B2* | 6/2008 | Robert | 73/504.12 |
| 7,434,464 B2* | 10/2008 | Li | 73/504.04 |
| 7,543,496 B2 | 6/2009 | Ayazi et al. | |
| 2001/0039834 A1 | 11/2001 | Hsu | |
| 2003/0000306 A1 | 1/2003 | Fell | |
| 2003/0127944 A1 | 7/2003 | Clark et al. | |
| 2003/0196490 A1 | 10/2003 | Cardarelli | |
| 2004/0055380 A1 | 3/2004 | Shcheglov et al. | |
| 2004/0060898 A1 | 4/2004 | Tsai | |
| 2005/0028591 A1 | 2/2005 | Lonsdale et al. | |
| 2005/0150296 A1 | 7/2005 | Painter et al. | |
| 2005/0172714 A1 | 8/2005 | Challoner et al. | |
| 2006/0037417 A1 | 2/2006 | Shcheglov et al. | |
| 2006/0273416 A1 | 12/2006 | Ayazi et al. | |
| 2007/0017287 A1 | 1/2007 | Kubena et al. | |
| 2007/0034005 A1 | 2/2007 | Acar et al. | |
| 2007/0119258 A1 | 5/2007 | Yee | |
| 2007/0220971 A1 | 9/2007 | Ayazi et al. | |
| 2007/0240508 A1 | 10/2007 | Watson | |
| 2007/0281381 A1 | 12/2007 | Ayazi | |
| 2008/0028857 A1 | 2/2008 | Ayazi et al. | |
| 2008/0148846 A1 | 6/2008 | Whelan et al. | |
| 2009/0064781 A1 | 3/2009 | Ayazi et al. | |
| 2009/0095079 A1 | 4/2009 | Ayazi | |
| 2009/0266162 A1 | 10/2009 | Ayazi et al. | |
| 2009/0280594 A1 | 11/2009 | Mehregany | |

OTHER PUBLICATIONS

Ayazi, F. and Najafi, K., "A HARPSS Polysilicon Vibrating Ring Gyroscope," *Journal of Microelectromechanical Systems*, Jun. 2001, pp. 169-179. vol. 10, No. 2.

Ayazi, F. et al., "High-Aspect Ratio Combined Poly and Single-Crystal Silicon (HARPSS) MEMS Technology," *Journal of Microelectromechanical Systems*, Sep. 2000, pp. 288-294, vol. 9, No. 3.

Ayazi, F., "A High Aspect-Ratio High-Performance Polysilicon Vibrating Ring Gyroscope," Ph.D. Dissertation, University of Michigan, Ann Arbor (2001).

Bernstein, J., et al., "A Micromachines Comb-Drive Tuning Fork Rate Gyrocope," *Proceedings MEMS 1993*, pp. 143-148.

Clark, W.A., "Micromachines Vibratory Rate Gyroscopes" Ph.D. Dissertation, University of California, Berkeley (1997).

Fuijita, T. et al., "Disk-Shaped Bulk Micromachined Gyroscope with Vacuum Sealing," *Sensors and Actuators*, May 2000, pp. 198-204, vol. 82.

Hao, Z. et al. "An Analytical Model for Support Loss in Micromachined Beam Resonators with In-plane Flexural Vibrations," *Sensors and Actuators A*, Dec. 2003, pp. 156-164, vol. 109.

Judy, M. W., "Evolution of Integrated Inertial MEMS Technology," *Solid-State Sensors, Actuators and Microsystems Workshop*, Hilton Head Island, South Carolina, Jun. 2004, pp. 27-32.

Najafi, K., "Micropackaging Technologies for Integrated Microsystems: Applications to MEMS and MOEMS," *Proc. SPIE Micromachining & Microfabrication Symp.* 2003, pp. 1-19.

Schwarzelbach, O., et al., "New Approach for Frequency Matching of Tuning Fork Gyroscopes by Using a Non-Linear Drive Concept," *Proceedings Transducers* 2001, pp. 464-467.

Sharma, A. et al., "A 0.1°/Hr Bias Drift Electronically Matched Tuning Fork Microgyroscope," School of Electrical and Computer Engineering, Georgia Institute of Technology, Atlanta, GA, USA.

Sharma, A. et al. "A 0.2°/hr Micro-Gyroscope with Automatic CMOS Mode Matching," *2007 IEEE International Solid-State Circuits Conference*, pp. 12-14.

Sharma, A. et al., "A 104dB SNDR Transimpedance-based CMOS ASIC for Tuning Fork Microgyroscopes," *IEEE 2006 Custom Integrated Circuits Conference (CICC)*, pp. 655-658.

Sharma, A. et al., "A Smart Angular Rate Sensor System," *Proceedings of the IEEE Sensors 2007 Conference*, Atlanta, GA, USA, Oct. 28-31, 2007, 4 pages.

Zaman, M. F. et al., "The Resonating Star Gyroscope," *Proceedings IEEE Conference on MEMS*, Jan. 2005, pp. 355-358.

Zaman, M., et al. "Towards Inertial Grade Microgyros: A High-Q In-Plane Silicon-on-Insulator Turning Fork Device," Solid-State Sensor, Actuator and Microsystems Workshop, Hilton Head Island, South Carolina, Jun. 2004, pp. 384-385.

\* cited by examiner

READOUT METHOD AND ELECTRONIC BANDWIDTH CONTROL FOR A SILICON IN-PLANE TUNING FORK GYROSCOPE

GOVERNMENT RIGHTS

The present invention was funded by the Defense Advanced Research Projects Agency (DARPA) under contract No. W31P4Q-04-1-R001. The U.S. Government has certain rights in this invention.

BACKGROUND

The present invention relates generally to microelectromechanical systems (MEMS) devices and operational methods, and more particularly, to the use of a zero rate output of a MEMS in-plane tuning fork gyroscope to electronically control the mechanical bias voltages to control the frequency difference between drive and sense resonant modes of the gyroscope.

Over the last decade, the resolution of silicon vibratory microgyroscopes has improved by almost ten times every two years. The improvements in noise floor can mainly be attributed to improved high aspect ratio microfabrication processes, better mechanical sensor design, and improved interfacing of the micromechanical sensor element with CMOS circuits. Current research is focused on development of microgyroscopes for automotive and consumer applications. However, existing microgyroscope performance must be improved by an order of magnitude if they are to be viable alternatives to fiber-optic gyroscopes. Low-cost, sub-degree per hour bias drift microgyroscopes will complement µ-gravity accelerometers to enable chip-scale navigation, and multi-axis motion analysis at micro-scale. In addition, such precision inertial measurement units (IMUs) are essential in micro-robotics, unmanned aerial/undersea vehicles and GPS-augmented navigation.

Micromachined Coriolis vibratory gyroscopes are ideal angular rate sensors for automotive applications, unmanned aerial vehicles, image stabilization in portable electronics and personal heading references, due to their low cost, light weight and small form factor. As MEMS gyroscopes attain inertial grade performance (i.e., sub-degree-per-hour rate resolutions and bias stabilities) the interface electronics that actuate, sense and control these micromechanical structures are key element in determining the over all performance of the micro-gyro system.

Micromachined gyroscopes constitute one of the fastest growing segments of the microsensor market. The application domain of these devices is quickly expanding from automotive to consumer and personal navigation systems. Examples include anti-skid and safety systems in cars, and image stabilization in digital cameras. Conventional MEMS gyroscopes do not meet the sub-degree-per-hour resolution and bias drift requirements needed in high precision applications such as inertial measurement units for GPS augmented navigation, robotics, unmanned surveillance vehicles, aircraft and personal heading references.

The majority of automotive and consumer electronics application require rate-grade performance, while high precision navigation-grade devices are suitable for inertial measurement units and high-end applications in aerospace and petroleum industry.

A multitude of applications exist in the automotive sector including navigation, anti-skid and safety systems, roll-over detection, next generation airbag and anti-lock brake systems. Consumer electronics applications include image stabilization in digital cameras, smart user interfaces in hand-helds, gaming, and inertial pointing devices. IMUs are self-contained units that can perform accurate short-term navigation of a craft/object in the absence of global positioning system (GPS) assisted navigation. An IMU typically uses three accelerometers and three gyroscopes placed along their respective sensitive axes to gather information about an object's direction and heading. MEMS-based IMUs are increasingly being used in unmanned aerial/undersea vehicles for navigation and guidance. Since these remotely operated unmanned aerial/undersea vehicles experience diverse environments, in terms of shock, vibration and temperature, periodic calibration and reconfiguration of the IMU components becomes all the more important. Additionally, these are applications where power and area are premium. This calls for the development of smart angular rate sensors.

Vibratory micromachined gyroscopes rely on Coriolis-induced transfer of energy between two vibration modes to sense rotation. Micromachined gyroscopes are increasingly employed in consumer and automotive applications, primarily due to their small size and low power requirements. However, they are yet to achieve performance levels comparable to their optical and macro-mechanical counterparts in high-precision applications such as space and tactical/inertial navigation systems.

Conventional MEMS vibratory gyroscopes have yet to achieve inertial grade performance. The requirements for inertial grade devices are rate resolutions and bias stabilities better than 0.1°/h. To achieve this, a vibratory gyroscope must attain very high quality factors (>30,000), large sense capacitances (>1 pF), large mass (>100 µg), and large drive amplitude (>5 µm).

The Brownian motion of the structure represents the fundamental noise-limiting component of a vibratory gyroscope. This is generally discussed, for example, by Ayazi, F., in "A High Aspect-Ratio High-Performance Polysilicon Vibrating Ring Gyroscope," *Ph.D. Dissertation*, University of Michigan, Ann Arbor (2001), and Ayazi, F. and Najafi, K., in "A HARPSS Polysilicon Vibrating Ring Gyroscope" *IEEEI-ASME JMEMS*, June 2001, pp. 169-179. By equating Brownian motion to the displacement caused by the Coriolis force, one can derive the mechanical noise equivalent rotation (MNEΩ) of the microgyroscope. This is expressed as $$MNE\Omega = \frac{1}{2q_{Drive}} \cdot \sqrt{\frac{4k_B T}{\omega_0 M}} \sqrt{BW}$$

This equation indicates that the mechanical noise floor varies inversely with the drive amplitude ($q_{Drive}$), the square root of the resonant drive frequency ($\omega_0$), and square root of the effective mass in the sense direction (M). Matching the resonant frequencies of the sense and the drive mode improves this resolution by a factor of $\sqrt{Q_{Sense}}$.

There is a need for improved tuning fork gyroscopes and angular rate sensors employing same that provide for electronic bandwidth control.

BRIEF DESCRIPTION OF THE DRAWINGS

The various features and advantages of the present invention may be more readily understood with reference to the following detailed description taken in conjunction with the accompanying drawing figures, wherein like reference numerals designate like structural element, and in which:

FIGS. 1b and 1c illustrate resonant mode shapes (exaggerated for clarity) of the gyroscope shown in FIG. 1a;

FIG. 2a-2d illustrates a process flow used to fabricate an exemplary gyroscope;

DETAILED DESCRIPTION

The present invention may be used in conjunction with a MEMS in-plane tuning fork gyroscope such as is disclosed in U.S. Pat. No. 7,043,985, issued May 16, 2006, and assigned to the assignee of the present invention. The contents of U.S. Pat. No. 7,043,985 are incorporated herein by reference in its entirety.

In order to overcome limitations of conventional microgyroscopes, disclosed are techniques that process the zero rate output of a micro-electromechanical systems in-plane tuning fork gyroscope to electronically control the mechanical bias voltages such that the frequency difference between drive and sense resonant modes of the microgyroscope is nulled. A software control algorithm, or mode-matching algorithm, is implemented in conjunction with control circuitry, preferably implemented in a CMOS ASIC, that adaptively biases the mechanical structure of the tuning fork gyroscope such that the drive and sense mode frequencies are equalized, or implements bandwidth enhancement at the expense of sensor sensitivity. This leverages the inherent high quality factor of the tuning fork microgyroscope and provides for an electronically reconfigurable "smart" angular rate sensor with superior sensitivity and bias drift.

Mode-matching of the tuning fork gyroscope may be achieved by increasing the DC polarization voltage ($V_P$) applied to the MEMS structure (gyroscope) until electrostatic spring softening decreases the sense mode frequency so that it is equal to that of the drive mode (~0 Hz split). Despite quadrature nulling, there always exists a finite amount of residual zero rate output. The amplitude of this residual zero rate output is maximized when the modes are matched and can therefore be used as an indicator of sensor sensitivity. This is a fundamental concept on which the software control algorithm achieves mode-matching and implements a reconfigurable system gain.

The phase difference between the drive output and the zero rate output is used as an indicator of system stability at the mode-matched condition. The mode-matching algorithm performs three steps in each iteration until a maximum in zero rate output level is detected. The algorithm (1) sends an interrupt to a timing unit that generates digital pulses that read in a $\Sigma\Delta$ bit stream, resets a level detector and updates a counter values, (2) compares the decimated value of the zero rate output level from the current iteration with that from the previous one, and (3) outputs a multi-bit control word to a $V_P$-stepper. Once the maximum is detected, the DC polarization voltage is decremented to its previous value, which corresponded to peak sensitivity. Finally, at matched-mode. the distinct 90° phase difference that exists between the drive signal (0° drive) and the zero rate output is monitored to ensure that mode-matching has indeed been achieved.

An exemplary mode-matching ASIC includes a level detector, analog-to-digital converter, a bidirectional counter with parallel load, and a digital-to-analog converter for generating the DC polarization voltage in discrete steps ($V_P$-stepper). The architecture of the digital-to-analog converter is preferably chosen so that the minimum voltage step size is controlled independently.

The mode-matched condition corresponds to maximum rate sensitivity and lowest noise drift. Another aspect is that the mode-matching algorithm and associated hardware may be used to electronically control system bandwidth inexpensively. If an application requires a larger bandwidth, the modes can be mismatched electronically in a controlled fashion to provide the required bandwidth at the expense of mechanical gain (i.e., rate resolution). The controlled mismatch is achieved by incrementing or decrementing the bidirectional counter to yield the desired value of the DC polarization voltage. Electronic bandwidth control can additionally be achieved by electronic loading of the mechanical quality factor of the drive mode. Further bandwidth control may be achieved by a combination of the above two techniques, i.e., controlled mode-splitting and electronic Q-loading.

Disclosed herein is a smart angular rate sensor system that comprises a high performance MEMS tuning fork gyroscope interfaced with CMOS circuitry and a dedicated control algorithm running on a microcontroller. The system allows software control of parameters of the tuning fork gyroscope, thereby allowing for easy reconfiguration and auto-calibration, in the field. This control technique addresses issues that cannot be solved by a simple trimming procedure at the time of manufacture. As these sensors experience diverse conditions in the field, it is impossible to recreate actual field conditions at the time of manufacture.

The interface architecture and CMOS ASIC substantially improves the performance of a high-Q tuning fork gyroscope through automatic matching of its resonant modes, yielding a low-cost microgyroscope with bias drift of 0.2°/hr. This bias drift is two orders of magnitude better than commercially available MEMS gyroscopes and is the lowest recorded to date for a MEMS gyroscope.

Figure 1A:
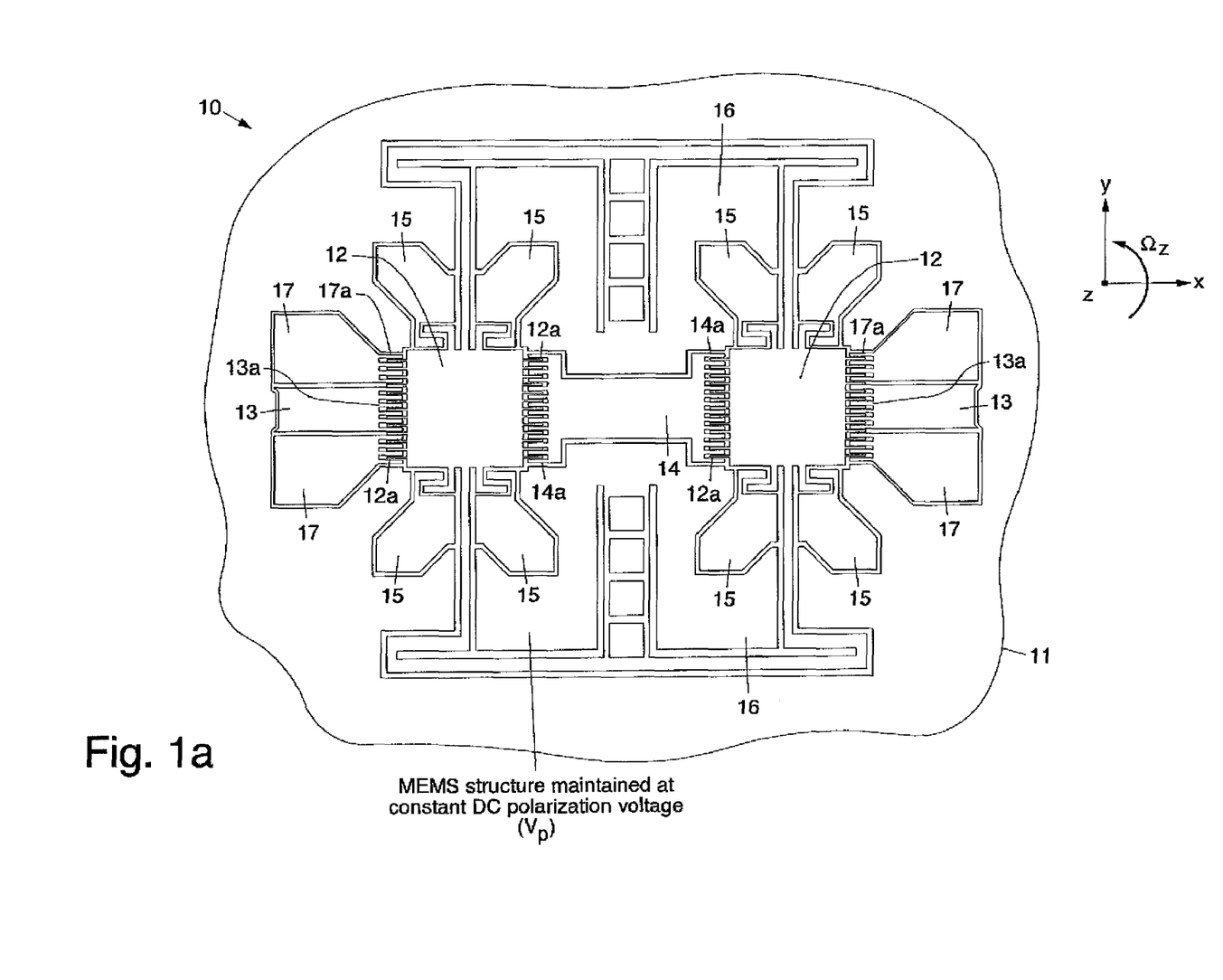
FIG. 1a illustrates an exemplary tuning fork gyroscope.

Referring to the drawing figures, FIG. 1a illustrates an exemplary matched-mode in-plane solid-mass single-crystal silicon tuning fork gyroscope 10. The tuning fork gyroscope 10 may be fabricated on 50 μm-60 μm thick silicon on insulator (SOI) substrate using a simple two-mask bulk-micromachining process. FIG. 1a is a top view of the tuning fork gyroscope 10 showing a device layer 23 (FIGS. 3a-3d).

It is to be understood, that while the exemplary gyroscope 10 described herein may be fabricated using silicon, other semiconductor materials, such as quartz or polycrystalline silicon, for example, or an electrically-conductive substrate, for example, may readily be employed. Thus, it is to be understood that the present invention is not limited to silicon structures. Also, although the insulating layer is preferably oxide, it is to be understood, that other insulating material, such as nitride, for example, may also be used, depending upon the application.

The exemplary gyroscope 10 is fabricated as a single-crystal structure using microelectronic processing techniques. The components making up the gyroscope 10 are fabricated by depositing, patterning and etching layers of semiconductor material and insulating layers to create the desired interconnected and/or coupled components.

The gyroscope 10 comprises a flexible support structure 11 (also referred to as flexures 11 or beams 11) which is semiconductor material used to support components of the gyroscope 10. First and second offset proof masses 12 are supported by the support structure 11. Distal and proximal ends of the proof masses 12 each have a plurality of fingers 12a (or projections 12a) extending outwardly therefrom. First and second drive electrode 13 are disposed adjacent to an outward ends of the first and second proof masses 12 and have a plurality of fingers 13a (projections 13a) extending inwardly therefrom. A central drive electrode 14 is disposed between the proof masses 12. The central drive electrode 14 has a plurality of fingers 14a (projections 14a) extending outwardly from either lateral edge thereof. A plurality of sense electrode 15 are disposed adjacent lateral edges of the first and second proof masses 12. Quadrature nulling electrodes 17 are laterally disposed adjacent to the first and second drive electrodes 13. The quadrature nulling electrodes 17 each have a plurality of fingers 17a (projections 17a) extending inwardly therefrom.

The respective fingers 12a of the proof masses 12 and the fingers 13a, 14a, 17a of the drive electrodes 13, 14 and quadrature nulling electrodes 17 lie adjacent to one another and have air gaps between them. The respective pluralities of fingers 12a, 13a, 14a, 17a are interdigitated and comprise comb drive electrodes. As will be discussed below, the proof masses 12 are suspended in air, and the first, second and central drive electrodes 13, 14 are supported by an insulating layer 22 (FIGS. 3a-3d) and a lower or handle layer 21, or substrate 21 (FIGS. 3a-3d).

First and second anchors 16 are supported by the insulating layer 22 and handle layer 21 and are laterally disposed relative to the central drive electrode 14 and the proof masses 12. The anchors 16 provide support for a tuning fork structure corresponding to the proof masses 12 and drive electrodes 13, 14. The proof masses 12 and flexible support structure 11 that connect proof-masses 12 to the anchors 16 are supported by the handle layer 21 or substrate 21.

The operating principle of the in-plane tuning fork gyroscope 10 is based upon a conventional mechanical tuning fork's response to rotation. The twin proof-masses 12 are centrally anchored and driven into resonant oscillations along the x-axis using comb-drive electrodes, i.e., interdigitated fingers 12a, 13a, 14a, 17a (drive mode). The drive mode is excited using the central drive electrode 14 to ensure that the proof-masses 12 vibrate anti-phase to one another, preventing lock-in to spurious in-plane modes. Coriolis acceleration induced by rotation about the z-axis is sensed capacitively along the y-axis (sense mode). The operating frequency of the gyroscope 10 is approximately 15 kHz, and the anchors 16 and flexures 11 are designed to provide high mechanical quality factors by minimizing support loss and thermoelastic damping. The fully symmetric and differential Coriolis detection mechanically rejects any linear vibration or acceleration as common mode.

A major incentive in using this symmetric tuning fork architecture, as opposed to a conventional frame-design or single-mass-design, is differential sensing capability. As a result, linear acceleration/shock signals are rejected as "common mode" without the need for complex electronics. The spring-like structure design (provided by the flexible support structure 11) makes it possible to drive the solid proof masses 12 linearly with displacement amplitudes in the range of 4-6 μm. A high Q in the drive mode is necessary to produce large drive amplitudes using small drive voltages, which is a highly desirable feature required in low-power CMOS interfaces. A high Q in sense mode substantially increases sensitivity of the gyroscope 10 and lowers the Brownian noise floor of the gyroscope 10.

Figure 3:
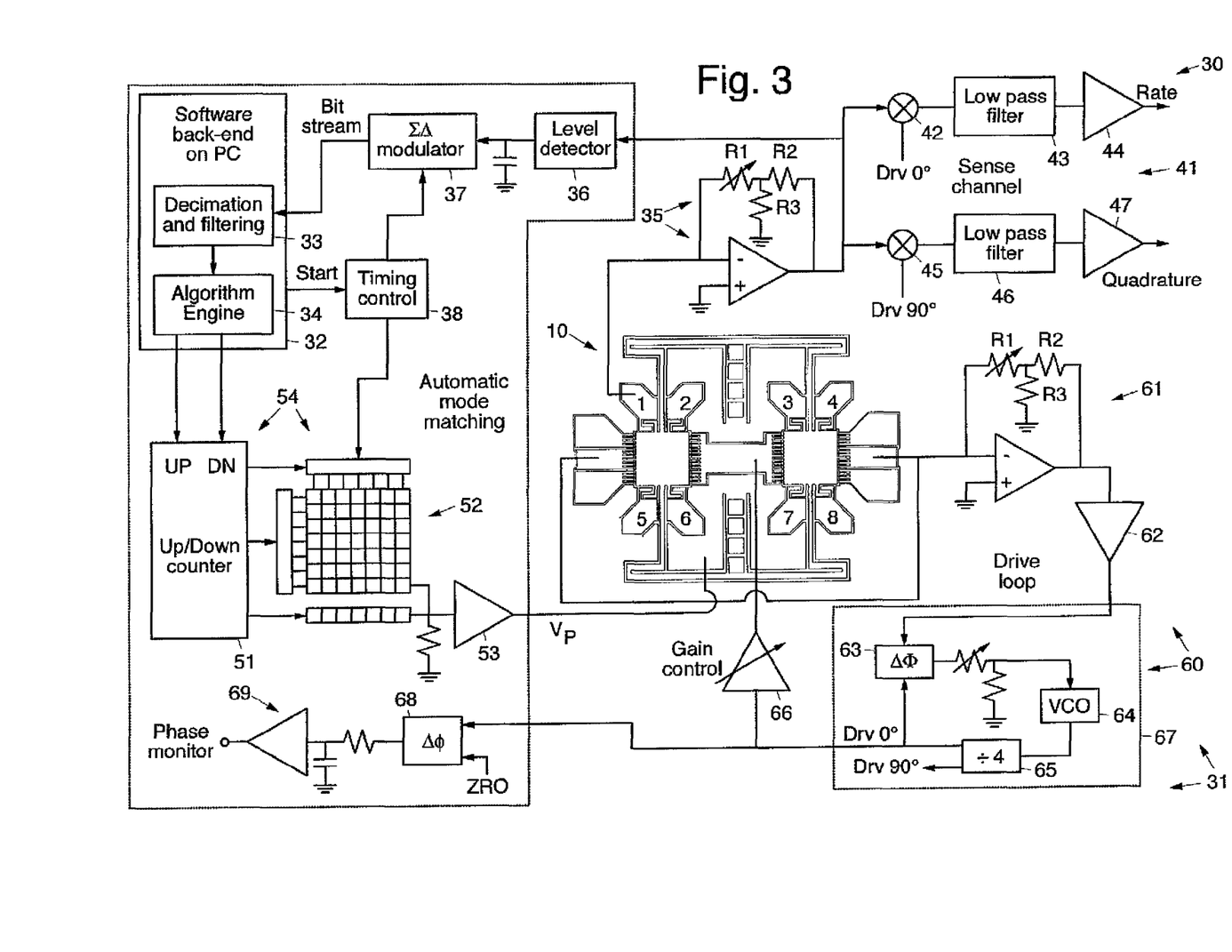
FIG. 3 illustrates an exemplary sensor comprising the tuning fork gyroscope.

The equations below define the mechanical noise floor (MNEΩ) and current sensitivity of the tuning fork gyroscope 10, where $k_B$ is Boltzmann's constant, T is the absolute temperature, $q_{Drive}$ is the amplitude of the vibration of the proof-mass 12 along the x-axis, M is the effective mass, $\omega_0$ is the operating frequency of the sensor 30, $V_P$ is the DC polarization voltage applied to the gyroscope 10, $d_{SO}$ is the capacitive gap associated with the sensor rest capacitance ($C_{SO}$), and $Q_{EFF}$ is the effective mechanical quality factor.

$$MNE\Omega = \frac{1}{2q_{Drive}} \sqrt{\frac{4k_B T}{\omega_0 M Q_{EFF}}} \sqrt{BW}$$

$$I_{SENSOR} = \frac{2V_P C_{SO} Q_{EFF} q_{drive}}{d_{so}} \Omega_Z$$

Figure 1B:
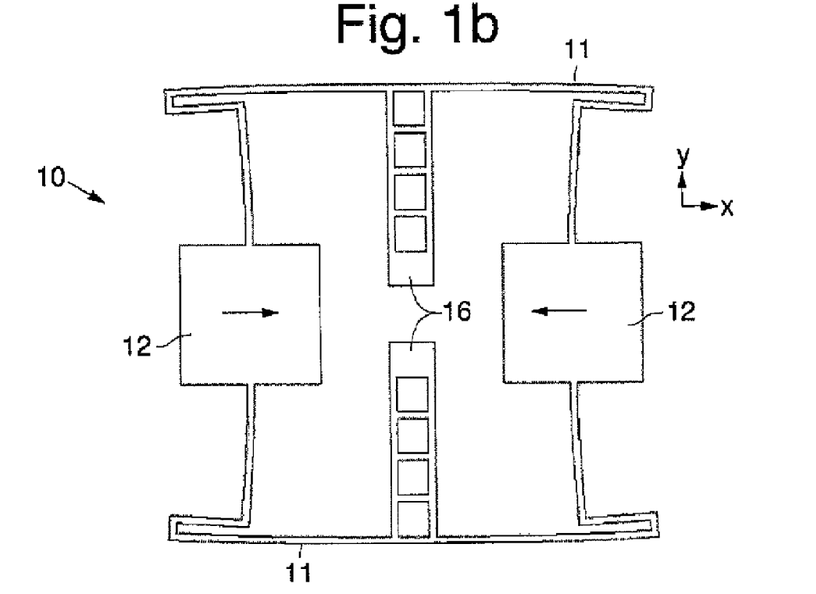
Figure 1C:
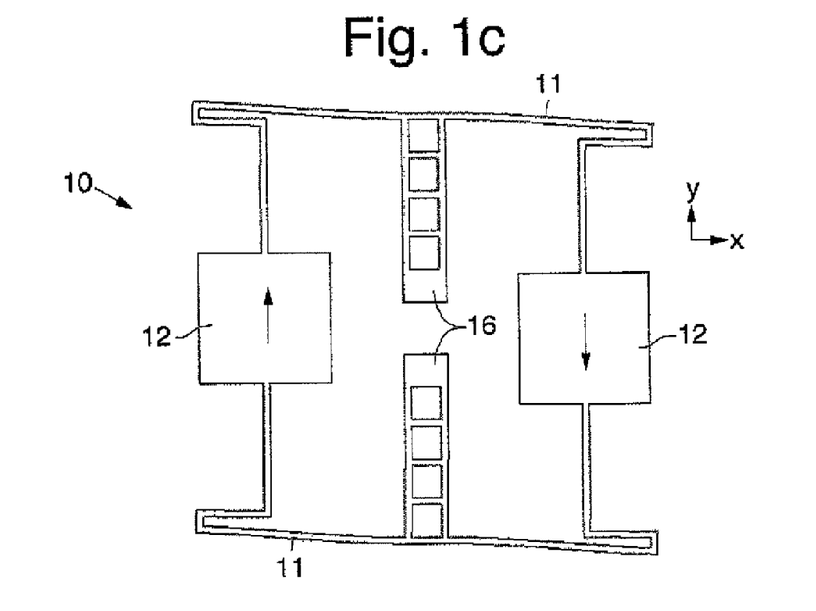
Figure 2A:
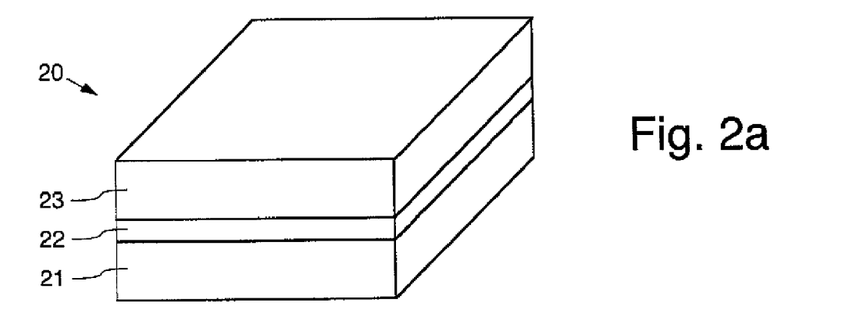
Figure 2B:
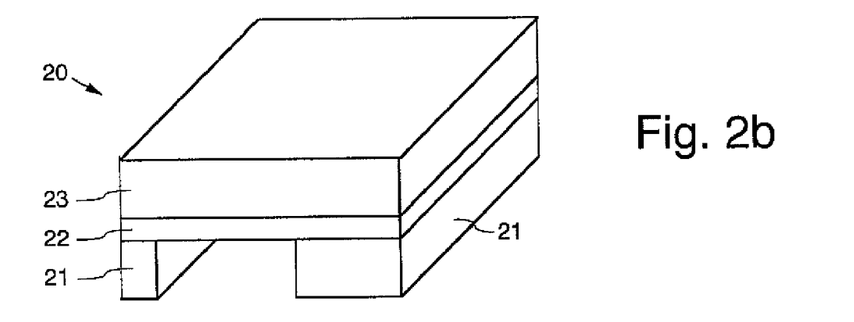
Figure 2C:
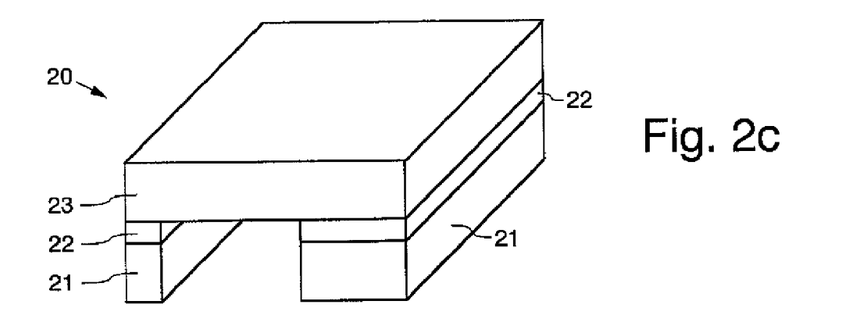
Figure 2D:
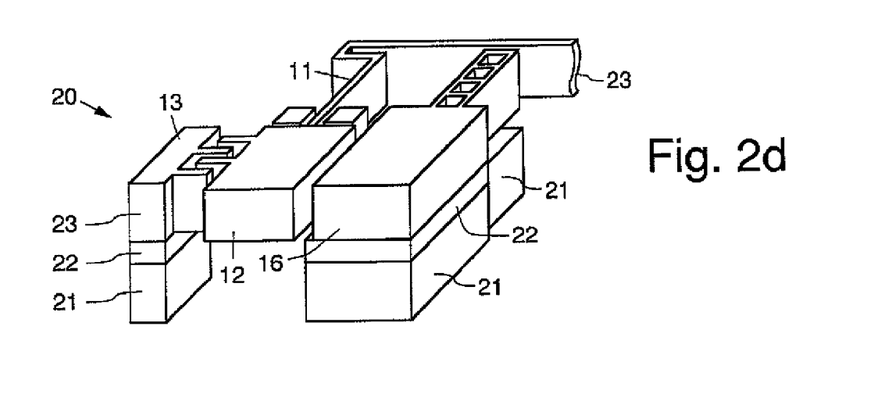

The primary energy loss mechanism that leads to Q degradation are a combination of support loss, thermoelastic damping and surface roughness profile of flexures. This is discussed by Z. Hao, et al., in "An Analytical Model for Support Loss in Micromachined Beam Resonators with In-plane Flexural Vibrations," *Sensors and Actuators* A, Vol. 109, December 2003, pp. 156-164. The anchors 16 and the support flexures 11 are designed to ensure minimal support loss and consequently high Q in the drive and sense modes by torque cancellation/reduction. Detailed ANSYS simulations of the flexures were performed to optimize structural dimensions and to allow the sense mode to occur 50-100 Hz higher than the drive mode. Once the gyroscope 10 is fabricated, the sense mode is tuned electrostatically using the tuning electrodes 14 to match the drive mode frequency. FIGS. 1b and 1c show exemplary resonant mode shapes for an exemplary gyroscope 10 as simulated in an ANSYS computer simulation (exaggerated for clarity). The arrows within the proof masses 12 indicate direction of motion.

Quadrature error in the tuning fork gyroscope 10 arises due to off-axis motion of the proof-masses 12 owing to fabrication induced device misalignments. This results in unwanted zero rate output (ZRO) at the operating frequency of the gyroscope 10. In the gyroscope 10, dedicated quadrature nulling electrodes 17 are added at the outer corners of each proof-mass 12, as shown in FIG. 1a. The zero rate output is minimized in a post fabrication trimming step by applying DC voltages at specific quadrature nulling electrodes 17, which properly aligns the tuning fork gyroscope 10.

This alignment involves application of appropriate rotational torques on each proof-mass 12, thereby aligning them and decreasing the magnitude of the zero rate output. However, the quadrature nulling technique only reduces the amount of zero rate output in the gyroscope 10, and does not eliminate it altogether.

FIG. 2a-2d illustrates fabrication of the gyroscope 10. Referring to FIG. 2a-2d, the gyroscope 10 comprises a lower or handle layer 21 or substrate 21 and the top or device layer 23, with an insulating layer 22 disposed there between. During fabrication, portions of the lower and upper layers 21, 23 and insulating layer 22 are removed using microelectronic fabrication processes to form the gyroscope 10.

More particularly, FIG. 2a-2d illustrates a process flow used to fabricate the gyroscope 10 shown in FIG. 1a. Only a portion of the gyroscope 10 is illustrated in FIG. 2a-2d. Moving sections of the gyroscope 10 and areas under the comb drives 18 are first released from the backside of the wafer by etching a handle silicon layer 21 through to a buried oxide layer 22 (insulating layer 22) using a well-known Bosch process. The buried oxide layer 22 is then removed in a reactive ion etching (RIE) system and finally a top layer 23 is patterned all the way through, leaving behind a suspended structure whose anchors 16 are supported by the handle layer or substrate 21 via several support posts 25 of the flexible support structure 11. The final etch step involves a short hydrofluoric acid (HF) etch to release areas under the support posts 25.

The fabrication process is very simple and precludes the requirement of any perforations in the proof mass 12, resulting in a larger mass per unit area. The simultaneous elimination of a ground plane under the comb drives 18 prevents excitation of the out of plane modes and detrimental effects of levitation. The fabrication of the device may also be performed with the same properties using buried cavity wafers.

FIG. 3 illustrates an exemplary angle rate sensor 30 comprising the tuning fork gyroscope 10 and electronic control circuitry 31. There are four main electronic loops including drive oscillator, sense channel, quadrature nulling and trimming, and automatic mode-matching.

Transresistance front-ends are used in the tuning fork gyroscope 10 to perform capacitance-to-voltage conversion. The T-network transimpedance amplifiers 35, 61 are relatively immune to parasitic capacitance ($C_{TOT}$) that is significant in a two-chip implementation of the sensor 30, for example. Large transimpedance gains may be implemented in an area and power-efficient manner on-chip by using the T-network transimpedance amplifiers 35, 61, as shown in FIG. 3. By strategic sizing of the resistor ratio R2/R3, it is possible to obtain large signal-to-noise ratios, while keeping noise gain to a minimum. For example, continuous time CMOS T-network transimpedance amplifiers 35, 61 having a minimum detectable capacitance of 0.02 aF/√Hz and dynamic range of 104 dB may be used to perform capacitance-to-voltage conversion along both the drive and sense axes.

The drive mode of the gyroscope is excited into mechanical resonance using the drive electrodes 13, 14 which are controlled via a drive loop 60. The drive loop 60 comprises a high gain T-network transimpedance amplifier 61 having an input coupled to the first and second drive electrodes 13 of the gyroscope 10. The T-network transimpedance amplifier 61 is used in a high gain setting. The phase lock loop 67 locks on to the resonant frequency. The phase lock loop-based drive loop oscillator 64 provides the required phase shifted signals to sustain electromechanical drive oscillations and to perform the required signal processing operations in the sensor 30. The output of the divide by four circuit 65 produces signals that are in-phase (Drv 0°) and in quadrature-phase (Drv 90°) with the velocity of the gyroscope proof-masses. The in-phase (Drv 0°) signal is applied to the phase detector circuit 63. The in-phase (Drv 0°) signal is also coupled by way of a gain control amplifier 66 to the central drive electrode 14 to maintain electromechanical resonance.

The output signals from each sense transimpedance amplifier 35 are processed by a sense channel 41 to produce rate and quadrature output signals. When the gyroscope 10 is subject to rotation, a Coriolis signal shows up as an amplitude modulated (AM) signal at the sensor resonant frequency. The rotation signal is extracted by performing synchronous demodulation in the sense channel 41 using the output of the phase lock loop 60, which is proportional to the velocity of the proof mass 12. The multipliers 42, 45 are preferably implemented as Gilbert multipliers 42, 45, and the outputs of the multipliers 42, 45 are low-pass filtered to provide a signal proportional to the input rotation rate. The sense channel 41 comprises an in-phase multiplier 42 that is coupled through a low pass filter 43 to an in-phase amplifier 44 that produces a rate output signal. The in-phase multiplier 42 receives the in-phase (Drv 0°) signal. The sense channel 41 also comprises a quadrature multiplier 445 that is coupled through a low pass filer 46 to a quadrature amplifier 47 that produces an analog signal that is proportional to the quadrature error in the gyroscope. The quadrature multiplier 42 receives the quadrature-phase (Drv 90°) signal.

Automatic Mode-Matching

Mode-matching is achieved by increasing the DC polarization voltage ($V_P$) on the MEMS structure until electrostatic spring softening decreases the sense mode frequency to become equal to that of the drive mode (~0 Hz split). The sense frequency is ~100 Hz higher than the drive frequency to allow mode-matching despite process variation.

Figure 4:
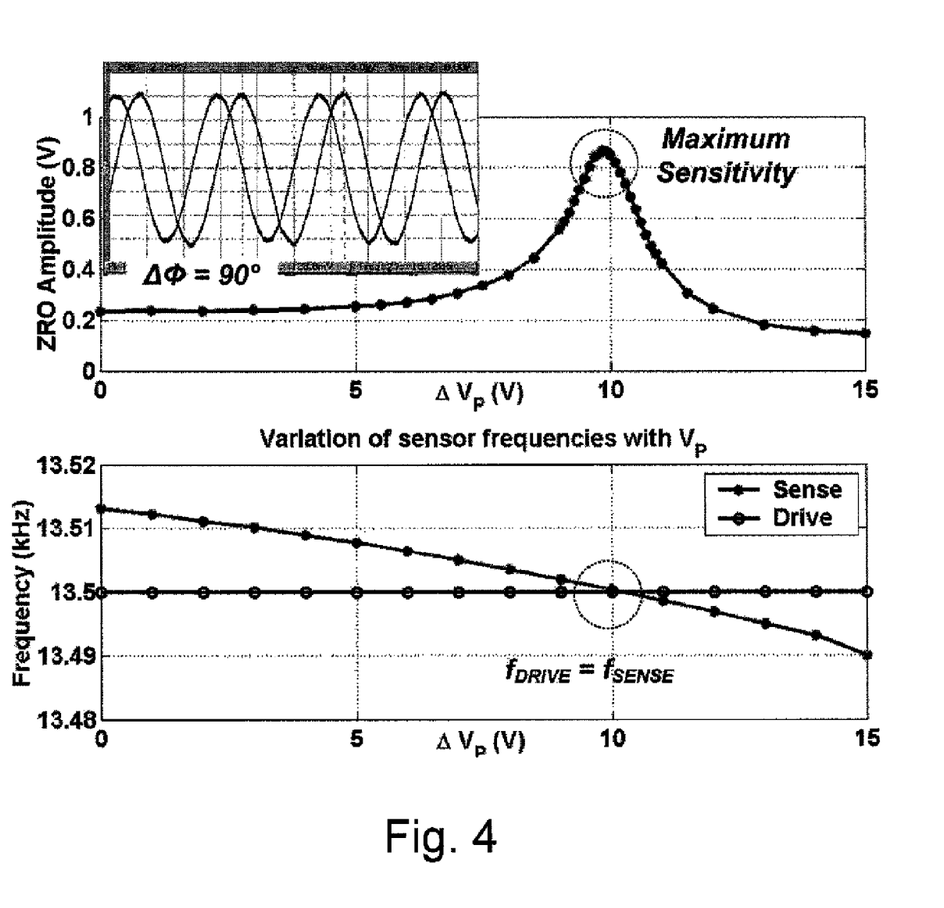
FIG. 4 illustrates mode matching characteristics (physical ZRO) for an exemplary gyroscope.

Also, despite quadrature nulling, there exists a finite amount of residual zero rate output. The amplitude of the residual zero rate output is maximized when the modes are matched and can therefore be used as an indicator of sensitivity of the sensor 30. Additionally, at mode-matched condition, there is a distinct 90° phase shift between the drive output and ZRO. FIG. 4 illustrates mode matching characteristics (physical ZRO) for an exemplary gyroscope 10. Once matched, synchronous I-Q demodulation is used to distinguish between the quadrature error and the Coriolis signal. This is a fundamental concept on which the software control algorithm 34 achieves mode-matching and provides for reconfigurable system gain.

The software control algorithm 34 provides for electronic tuning of the sense mode resonant frequency to make it equal to the drive mode resonant frequency. This feature differentiates the mode-matched tuning fork gyroscope 10 from other MEMS gyros. More particularly, the electronic control circuitry 31 includes a computer 32 comprising a decimation and filtering circuitry/software 33 that is coupled to a processing engine that implements the software control algorithm 34. The computer 32 and the electronic control circuitry 31 implement automatic mode matching of the tuning fork gyroscope 10.

Figure 7:
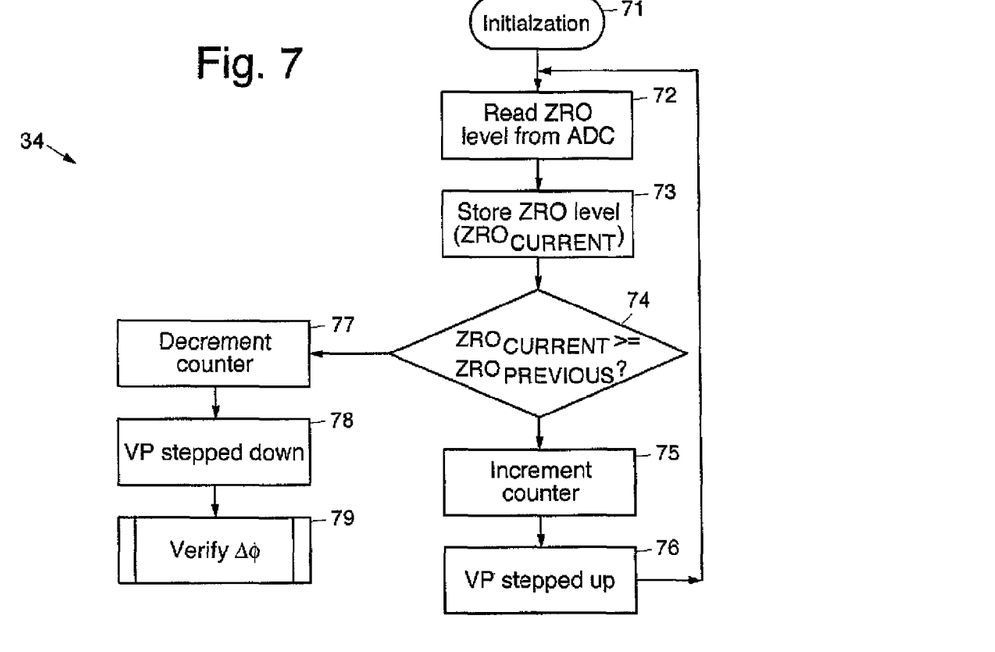
FIG. 7 illustrates an exemplary mode matching algorithm.
Figure 7A:
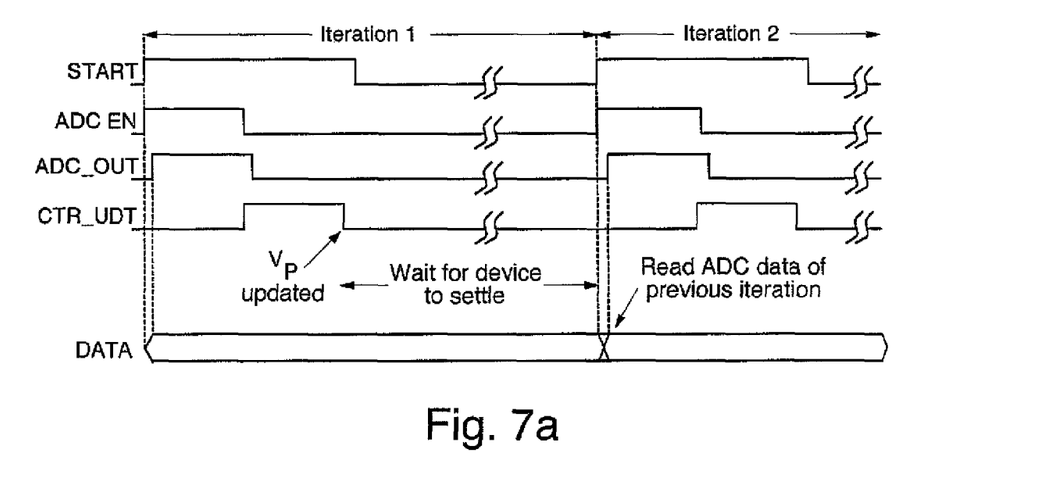
FIG. 7a illustrates exemplary timing for the gyroscope using the mode matching algorithm.

The MEMS sensor 30 may be interfaced to the electronic control circuitry 31, which may comprise a CMOS ASIC, and the control software algorithm 34. Alternatively, the CMIOS ASIC can itself contain the software algorithm by using Read-Only-Memory (ROM) and EEPROM. FIG. 7 illustrates an exemplary mode matching algorithm 34 while FIG. 7a illustrates exemplary timing for the gyroscope 10 using the exemplary mode matching algorithm 34. The mechanical imperfections of the sensor 30 are exploited to achieve mode matching automatically.

The exemplary mode matching algorithm 34 is initialized 71 and the zero rate output level is read 72 from the analog-to-digital converter 52. The architecture of the ADC is not restricted to a sigma-delta, but can be either a successive approximation (SAR) or Flash, as will be evident to one skilled in the art. The current zero rate output level ($ZRO_{CURRENT}$) is stored 73. A decision is made 74 whether the current zero rate output level ($ZRO_{CURRENT}$) is greater than or equal to the previous zero rate output level ($ZRO_{PREVIOUS}$). If the current zero rate output level is less than the previous zero rate output level, the counter 51 is incremented 75, the polarization voltage ($V_P$) is stepped up 76, and the next zero rate output level is read 72 from the analog-to-digital converter 52. If the current zero rate output level is greater than or equal to the previous zero rate output level, the counter 51 is decremented 77, the polarization voltage ($V_P$) is stepped down 78, and the phase difference ($\Delta\phi$) is verified 79.

The automatic mode-matching algorithm 34 iteratively increments $V_P$ until a maximum in residual ZRO amplitude is detected. The 90° phase difference is monitored to ensure that mode-matching is achieved. Once matched, the bandwidth of the sensor 30 can be controlled by varying $V_P$ to introduce a controlled frequency separation between the drive and sense resonant modes.

The mode-matching algorithm 34 may be implemented in MATLAB or similar programming language and performs three steps in each iteration (FIG. 7) until a maximum in zero rate output level is detected. The algorithm 34 (1) sends an interrupt (START) to a timing control circuit 38 that generates digital pulses that read in the bit stream, resets the output of a level detector 36 and updates the counter values, (2) compares the decimated value of the zero rate output level from the current iteration with the value from the previous one, and (3) outputs a 2 bit control word to the $V_P$-stepper 54. Once the maximum has been detected, $V_P$ is decremented to its previous value, which corresponds to peak sensitivity. Exemplary timing is shown in FIG. 7a. The values of $V_P$ and normalized zero rate output levels may be stored in a look-up-table 39 (FIG. 8) during mode matching. Finally, at matched mode, the distinct 90° phase difference that exists between the drive signal (0° Drv) and the zero rate output signal is monitored to ensure that mode-matching is achieved. This approach is superior in that it is area and power efficient, eliminates manual trimming of the gyroscope 10, and provides bandwidth programmability.

T-network transimpedance amplifiers 35 (only one shown) process outputs sensed by the respective sense electrodes 15. The zero rate output level is detected using the level detector 36, which may comprise a 6.5 bit linear envelope detector that includes a gm-cell followed by a full wave rectifier and integrator. In the current embodiment, the DC level may be converted to a bit-stream using a 1st order $\Sigma\Phi$ modulator 37 read into the computer 32 via a general purpose interface bus (GPIB) and decimated using MATLAB. The integrator in the $\Sigma\Phi$ modulator 37 preferably uses a noise-optimized transconductance amplifier similar to that used in the transimpedance amplifier 35 and correlated double sampling to mitigate flicker noise and offset. In a reduced-to-practice embodiment, the power dissipation is 0.9 mW at a clock frequency of 25.6 kHz and measured $SNR_{MAX}$ for a signal of 100 Hz is 86 dB/Hz.

The bit stream from the $\Sigma\Phi$ modulator 37 is decimated and filtered by the decimation and filtering circuitry/software 33. Timing for the sigma-delta ($\Sigma\Delta$) circuit 37 is provided by the timing control circuit 38.

The software control algorithm 34 is used to iteratively increment the DC polarization voltage ($V_P$) applied to the MEMS structure (i.e., anchor 16) until a maximum in residual ZRO amplitude is detected. This is accomplished using a $V_P$ stepper circuit 54. The $V_P$-stepper 54 may include an 8-bit up-down counter 61 and a 6+3 partially segmented current-steering digital-to-analog (DAC) 52. The up/down counter 51 counts up, down or holds the value based on the 2-bit control word. The algorithm 34 outputs signals (UP/DN) that increment an up/down counter 51. The up/down counter 51 is coupled to an 8-bit digital-to-analog converter 52, for example, whose output is amplified by a buffer amplifier 53 and applied to the anchor 16 so as to apply and maintain a constant DC polarization voltage ($V_P$).

The in-phase (Drv 0°) signal is coupled to a phase detector ($\Delta\Phi$) circuit 68 which also received the zero rate output signal (output from the transimpedance amplifier). The output of the delta phi ($\Delta\Phi$) circuit 68 is processed by a phase detector 69 to monitor the phase difference between the drive and sense signals. An XOR phase detector 69 may be used to monitor the phase difference between the drive and sense signals. Comparators in the phase detector 69 ensure that the output of the phase detector 69 is purely indicative of phase change and that any amplitude variations are ignored.

Experimental Results

Figure 5:
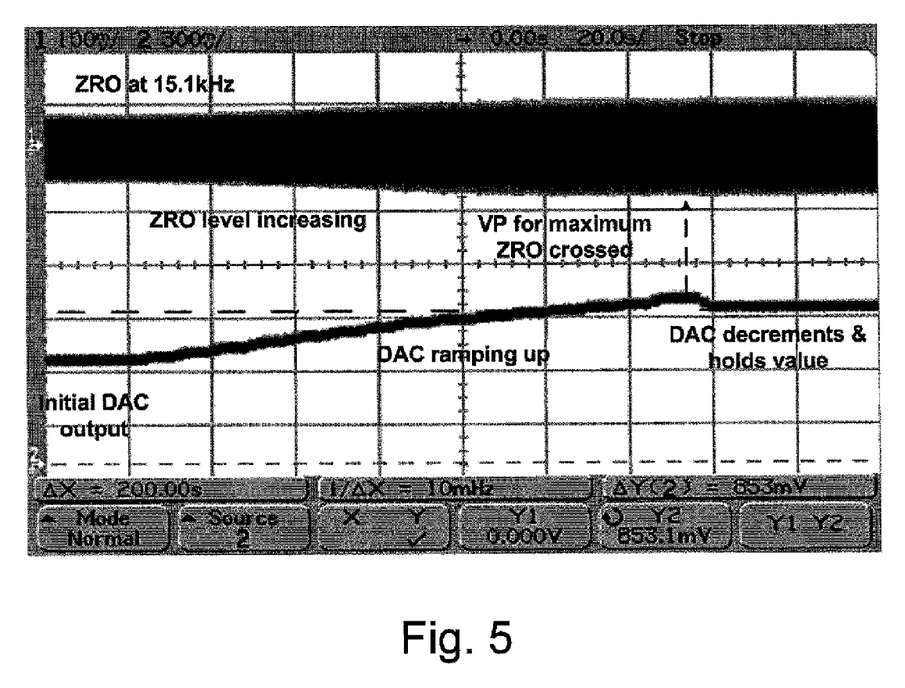
FIG. 5 illustrates mode matching characteristics (known $V_P$) for an exemplary gyroscope.

FIG. 5 shows results of interfacing the matched-mode tuning fork gyroscope 10 to a mode-matching ASIC. In particular, FIG. 5 illustrates mode matching characteristics (known $V_P$) for an exemplary gyroscope 10.

Figure 6A:
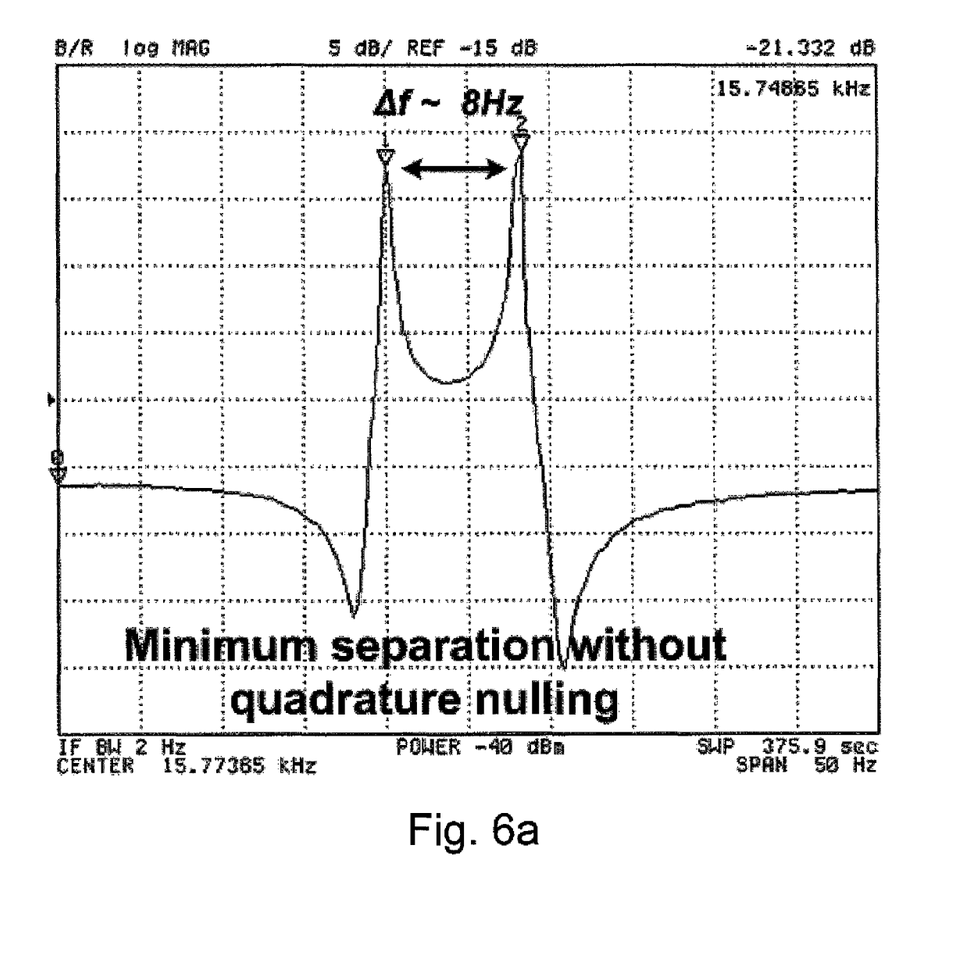
FIGS. 6a and 6b illustrate bandwidth enhancement and mode matching, respectively, attained by an exemplary gyroscope.
Figure 6B:
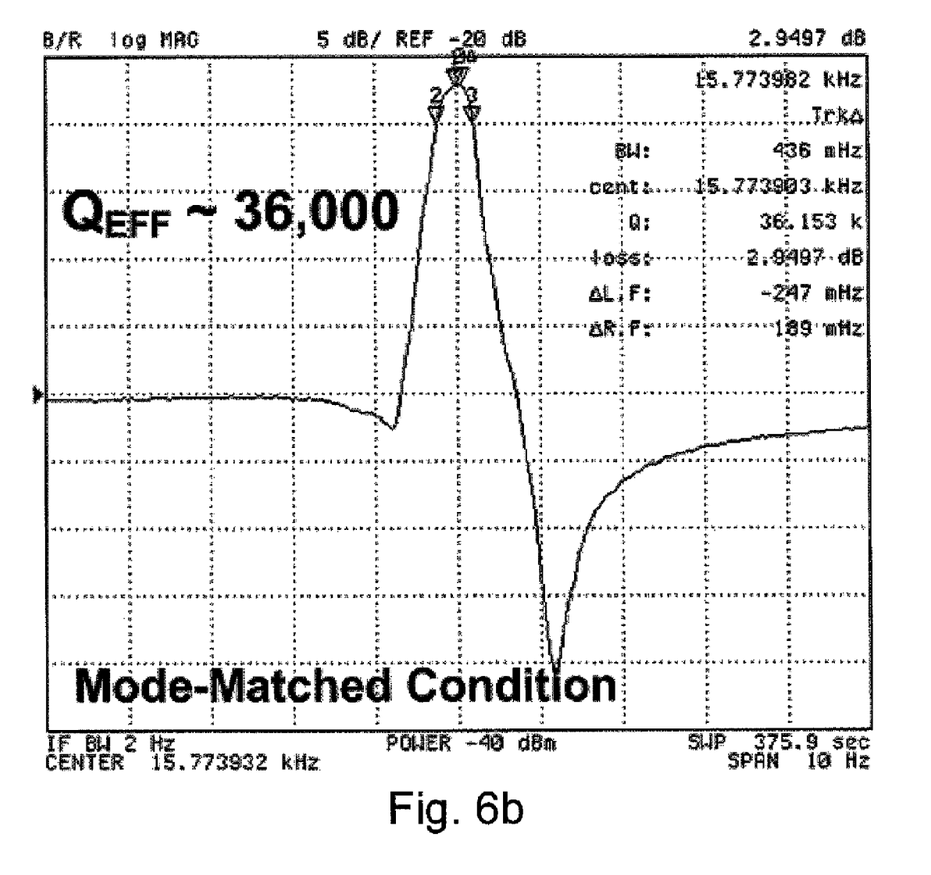

The graph shows that the zero rate output increases as the digital-to-analog converter 52 is incremented. Once the maximum has been crossed, the zero rate output level falls and the digital-to-analog converter 52 decrements to its previous value. The phase relationships between the various signals at matched-mode are shown in FIGS. 6a and 6b, where the 90° phase difference can be verified. More particularly, FIGS. 6a and 6b illustrate bandwidth enhancement and mode matching, respectively, attained by an exemplary gyroscope 10. The frequency domain mode shapes before and after mode-matching are shown in FIGS. 6a and 6b. The matched mode quality factor for this device was 36,000, which illustrates that quadrature nulling and automatic mode-matching are achieved without any degradation in the mechanical quality factor of the sensor 30.

Once matched electronically, the modes are stable and no continuous time monitoring or recalibration is necessary. Therefore, automatic mode-matching is implemented only when the bandwidth of the sensor 30 needs to be reconfigured or when recalibration is necessary. In tests performed on a reduced-to-practice sensor 30, the 90° phase difference, which is a sensitive indicator of system stability, showed a drift of only 0.09° over a period of 75 hours. The bias stability was measured using an Allan variance technique at 25° C. and was ~0.15°/hr, and the corresponding angle random walk was 0.003°/√hr. These represent the lowest reported values for any silicon-based micromechanical gyroscope to date. Once matched, the two resonant modes track each other with temperature, and mode-matching is maintained precluding the need for continuous mode monitoring.

Electronic Bandwidth Control

For a micromachined Coriolis vibratory gyroscope, the frequency separation between the two resonant modes ($\Delta f$) is a measure of the effective open-loop sensor bandwidth. At perfect mode-matched operation, the linear full-scale range of a reduced-to-practice sensor 30 is ±20 deg/second for the maximum achievable drive-mode amplitude of 4 μm and the effective sensor bandwidth is ~1 Hz. Such specifications are ideal for high-precision measurement and calibration functions such as gyro compassing and platform stabilization. While perfect mode matching provides exceptional enhancements in bias stability, it places certain limitations on dynamic range and sensor bandwidth, which are critical parameters in other applications such as commercial electronics (gaming consoles) and vehicle electronic stability control.

Figure 8:
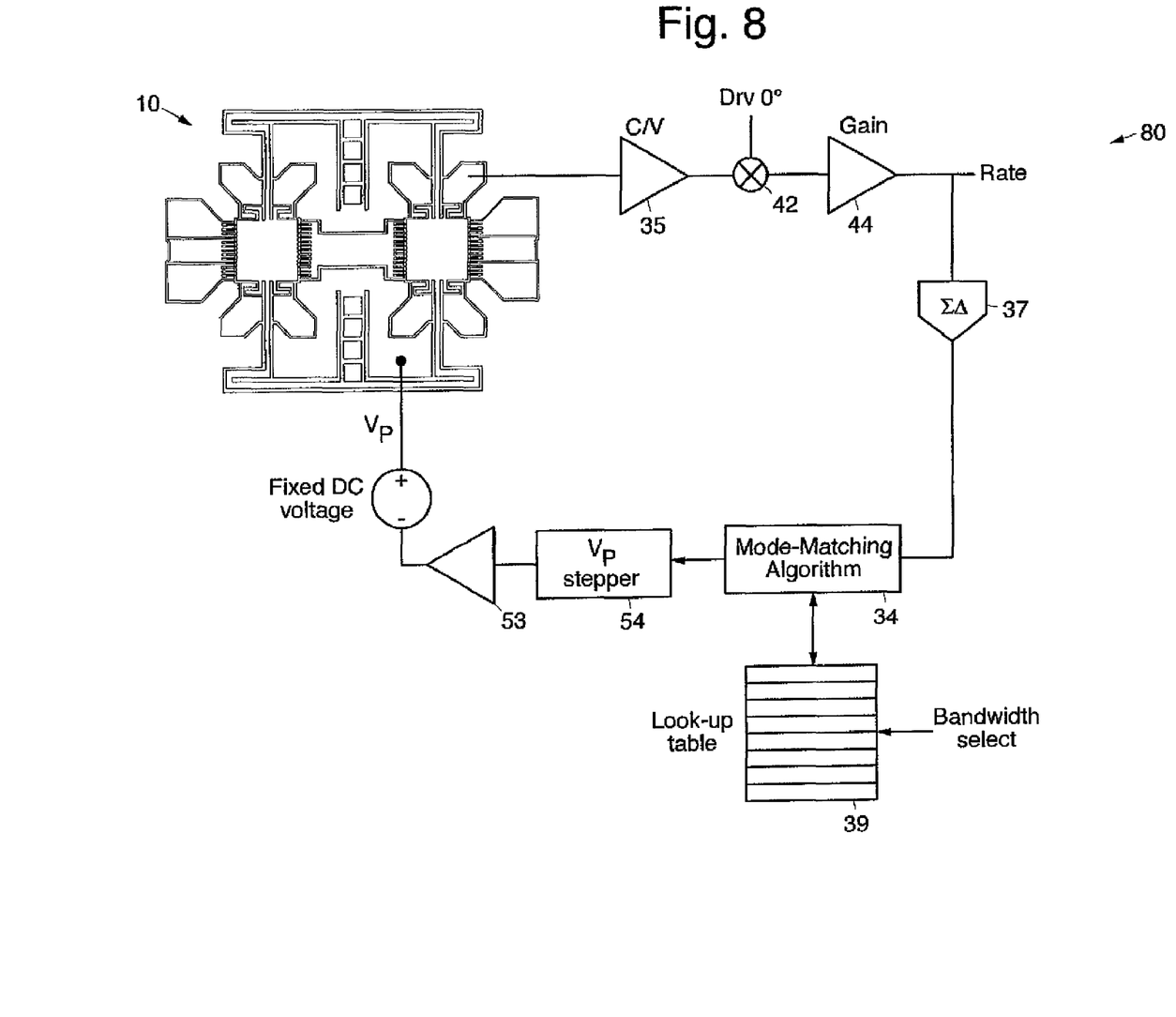
FIG. 8 shows a schematic of an exemplary electronic bandwidth control system.

One particular advantage of the disclosed architecture is that once matched, the modes can be mismatched by a known amount in a controlled fashion using the up/down counter 51 to obtain a desired bandwidth. This allows for electronic bandwidth control, such as is illustrated with reference to FIGS. 6a, 8 and 9. FIG. 8 shows a schematic of an exemplary electronic bandwidth control system architecture 80.

Referring to FIG. 8, the change in VP ($\Delta V_P$) introduces a specific amount of mismatch between the drive and sense modes is calculated from the tuning characteristics of the gyroscope 10, and stored in a look-up-table 39. Since the DAC voltage step is fixed, the number of iterations the DAC 52 must increment or decrement to achieve the desired frequency separation is known. The required number of pulses is sent out by the software 34 to a bidirectional counter 51, and the $V_P$ stepper 54 increments or decrements until the target $V_P$ is set on the gyroscope 10. This automatically sets the bandwidth of the microsensor 30 without addition of an extra control loop or added hardware.

Figure 9:
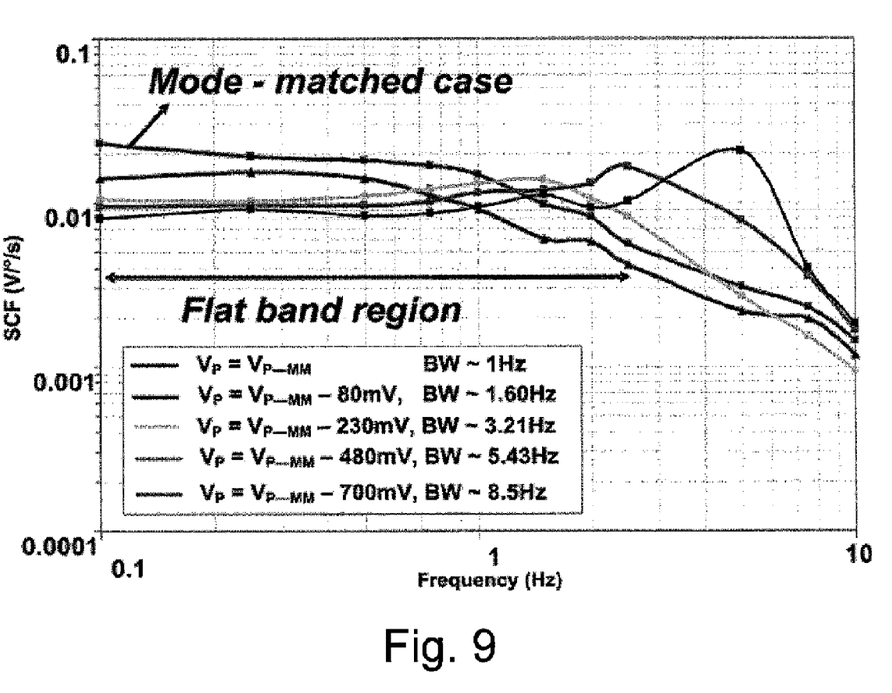
FIG. 9 plots scale factor (SF) for different bandwidths generated by incrementing and decrementing a $V_P$ stepper.

The disclosed mode-matching architecture can introduce a controlled mismatch ($\Delta f$) between drive and sense resonant frequencies, resulting in an open-loop sensor bandwidth equal to $\Delta f$. From the tuning characteristics, the corresponding $\Delta V_P$ is obtained, and the mode-matching algorithm 34 automatically increments or decrements the counter 51 to the desired value of $V_P$, setting the required bandwidth. The resultant decrease in scale factor may be electronically compensated if necessary. FIG. 9 plots scale factor (SF) for different bandwidths generated by incrementing and decrementing the $V_P$ stepper 54. Tests of a reduced-to-practice sensor 30 indicate that varying $V_P$ by 700 mV increases the sensor bandwidth from 1 to ~10 Hz.

In general terms, the disclosed sensor 30 comprises a gyroscope 10, such as a microelectromechanical systems tuning fork gyroscope 10 having a plurality of proof masses 12, that is driven into drive mode resonance by drive electrodes 13 and exhibit sense mode resonance induced by rotation and residual quadrature error sensed by sense electrodes 15. Control circuitry 31 is coupled to the drive electrodes 13 and sense electrodes 15 that processes the residual quadrature error to generate a polarization voltage applied to the gyroscope 10 to minimizing the frequency difference between drive and sense resonant modes. The control circuitry 31 may be configured to process the residual quadrature error to apply a polarization voltage to the gyroscope 10 that separates the drive mode resonance from the sense mode resonance to control operational bandwidth of the gyroscope 10. The control circuitry 31 may be further configured to adjusts the gain of the gyroscope 10 in proportion to the change in bandwidth of the gyroscope 10 to control the sensitivity of the gyroscope 10.

Thus, a sub-degree per hour noise floor and bias drift sensor 30 comprising a mode-matched tuning fork gyroscope 10 and its associated control circuitry has been disclosed. Performance benefits are achieved by operating the tuning fork gyroscope 10 in mode-matched condition (i.e., 0 Hz frequency separation between drive and sense resonant modes). Electronic bandwidth control and automatic mode-matching of the tuning fork gyroscope 10 provide for dynamic configuration of parameters of the tuning fork gyroscope 10. This makes the tuning fork gyroscope 10 and sensor 30 ideal for high precision, low bandwidth applications including gyro compassing, and tactical grade systems requiring bandwidths on the order of 1 to 10 Hz.

Thus, improved tuning fork gyroscopes and angular rate sensors having electronic bandwidth control have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

The invention claimed is:

1. Sensor apparatus comprising:
   (1) a microelectromechanical systems gyroscope comprising:
      an electrically-conductive substrate having a lower support layer and an upper flexible support layer;
      first and second separated proof masses that lie in and are supported by the upper flexible support layer and that are separated from the lower support layer;
      first and second drive electrodes disposed at distal ends of the proof masses that are insulatively supported by the lower support layer and that are separated from the upper flexible support layer;
      a central drive electrode disposed between the separated proof masses that is insulatively supported by the lower support layer and that is separated from the upper flexible support layer;
      sense electrodes disposed adjacent to the proof masses that are insulatively supported by the lower support layer and that are separated from the upper flexible support layer;
      quadrature nulling electrodes disposed at distal ends of the proof masses that are insulatively supported by the lower support layer and that are separated from the upper flexible support layer; and
   (2) control circuitry coupled to the lower support layer, the drive, sense, and quadrature nulling electrodes that comprises a mode-matching algorithm that adaptively biases the gyroscope so that drive and sense mode frequencies are equalized, or are electronically controlled to enhance the bandwidth of the gyroscope.

2. The apparatus recited in claim 1 wherein the first and second drive electrodes are disposed adjacent distal ends of the respective proof masses.

3. The apparatus recited in claim 1 wherein adjacent ends of the respective proof masses and the drive electrodes comprise pluralities of interdigitated projections that form comb drives.

4. The apparatus recited in claim 1 wherein the lower support layer comprises one or more anchors that couple the upper flexible support layer to the lower support layer.

5. The apparatus recited in claim 4 wherein the drive and sense mode frequencies are controlled to be at resonance.

6. The apparatus recited in claim 1 wherein the quadrature nulling electrodes are controlled by the control circuitry to mechanically balance the proof masses.

7. The apparatus recited in claim 1 wherein:
   the proof masses are driven into drive mode resonance by the drive electrodes and exhibit sense mode resonance induced by rotation and residual quadrature error sensed by the sense electrodes;
   and the control circuitry processes the residual quadrature error to generate a polarization voltage applied to the substrate to minimizing the frequency difference between drive and sense resonant modes.

8. The apparatus recited in claim 7 wherein the control circuitry processes the residual quadrature error to apply a polarization voltage to the gyroscope that separates the drive mode resonance from the sense mode resonance to control operational bandwidth of the gyroscope.

9. Sensor apparatus comprising:
   a gyroscope that is driven into drive mode resonance by drive electrodes and exhibit sense mode resonance induced by rotation and residual quadrature error sensed by sense electrodes; and
   control circuitry coupled to the drive electrodes and sense electrodes that processes the residual quadrature error to generate a polarization voltage applied to the gyroscope to minimize the frequency difference between drive and sense resonant modes.

10. The apparatus recited in claim 9 wherein the control circuitry applies a polarization voltage to the gyroscope that separates the drive mode resonance from the sense mode resonance to control operational bandwidth of the gyroscope.

11. The apparatus recited in claim 10 wherein the control circuitry further adjusts the gain of the gyroscope in proportion to the change in bandwidth of the gyroscope to control the sensitivity of the gyroscope.

12. The apparatus recited in claim 9 wherein the control circuitry applies a tuning/balancing voltage to selected sense electrodes to tune the drive and sense resonant modes of the gyroscope.

13. The apparatus recited in claim 10 wherein the control circuitry further applies a tuning/balancing voltage to selected sense electrodes to tune the drive and sense resonant modes of the gyroscope.

14. The apparatus recited in claim 9 wherein the gyroscope comprises a microelectromechanical systems tuning fork gyroscope having a plurality of proof masses.

* * * * *